Figure 1:
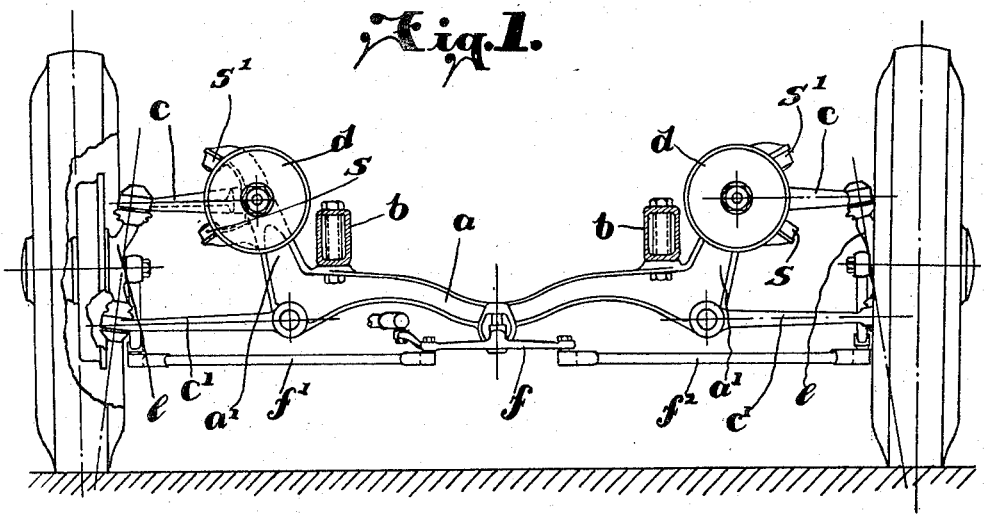

May 18, 1937.   C. MACBETH   2,080,969
AUTOMOBILE VEHICLE HAVING INDEPENDENTLY SPRUNG ROAD WHEELS
Filed Jan. 8, 1936   3 Sheets-Sheet 2
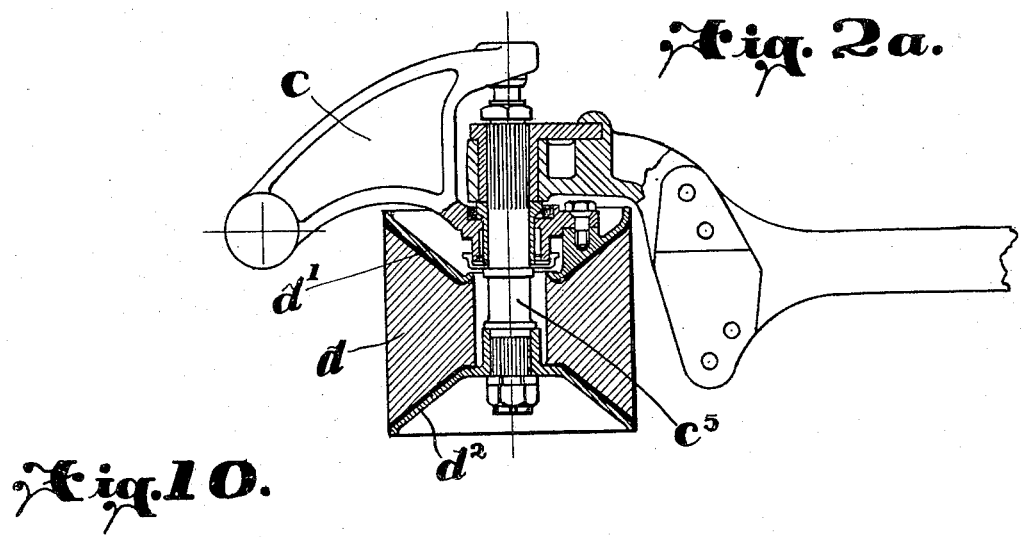
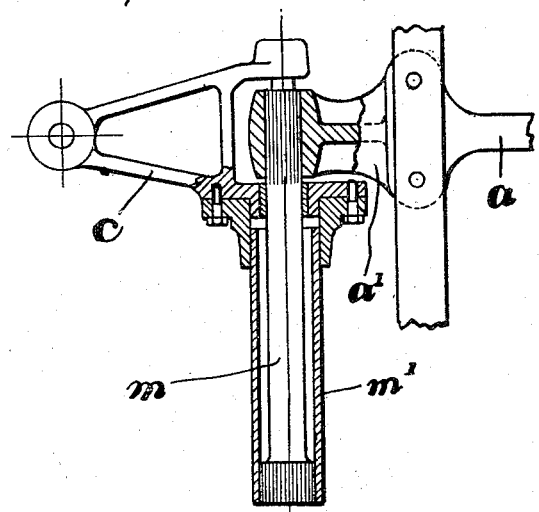
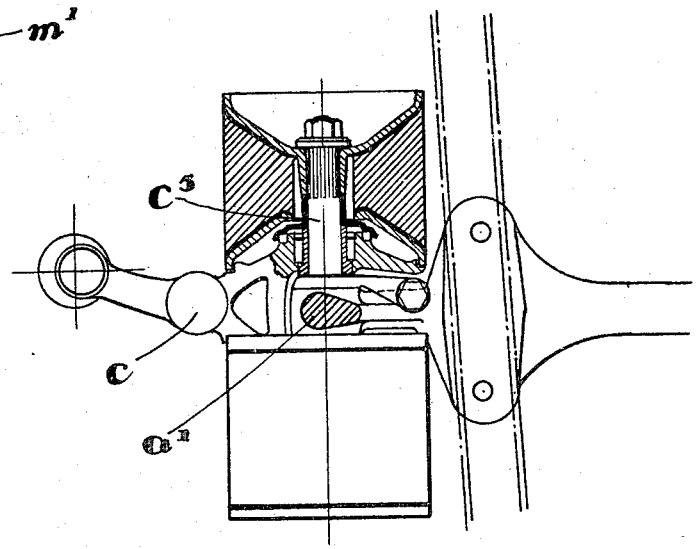
Inventor:-
Colin Macbeth,
By:- Smith, Michael & Gardiner, Attys.

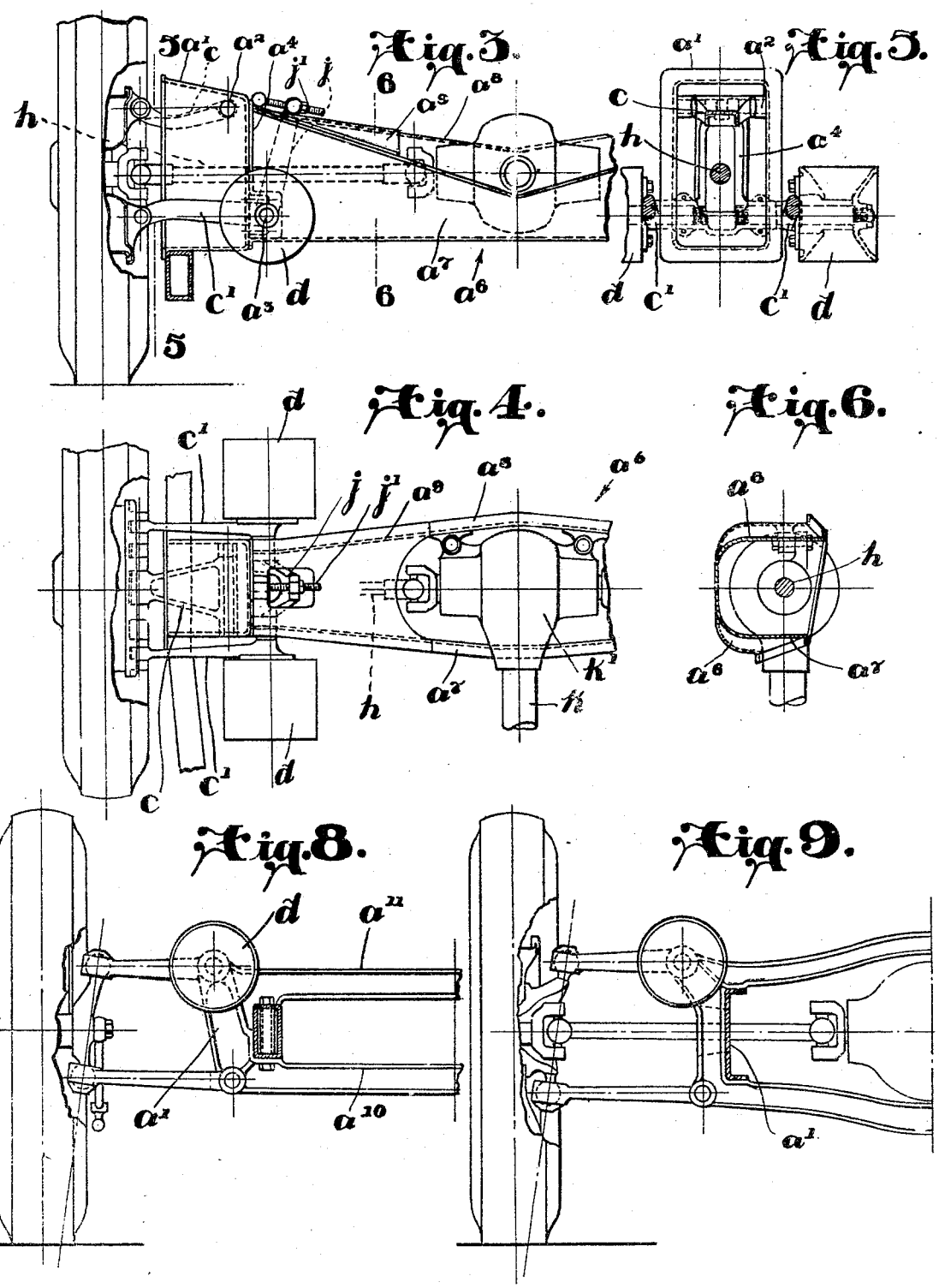

Patented May 18, 1937

2,080,969

UNITED STATES PATENT OFFICE 2,080,969

AUTOMOBILE VEHICLE HAVING INDEPENDENTLY-SPRUNG ROAD WHEELS

Colin Macbeth, Birmingham, England

Application January 8, 1936, Serial No. 58,207
In Great Britain December 20, 1934

11 Claims. (Cl. 280—124)

My invention has reference to independent spring suspension systems, for road wheels of automobile vehicles of the type in which the wheels are carried on oscillating lever arms or links, and torque-loaded springs are employed in conjunction with the said arms or links to take the load and deal with road and other shocks.

The improvements comprised in my present invention are concerned with suspensions for driven wheels, driven-and-steering wheels, steering wheels and undriven wheels, in which the wheel axles are carried on torque-sprung suspension links of the short-link parallelogram type, i. e. linkages which are arranged to oscillate in planes at right angles to the length of the vehicle frame and are constituted by a relatively-short top link (or a pair of such links) which is journalled at its inner end with respect to the said frame, a substantially-longer bottom link or links similarly journalled, and a connecting link which is articulated to the outer ends of the top and bottom links and carries the stub axle of the road-wheel.

The principal object of my invention is to provide complete or self-contained wheel-suspension units or assemblies which may be standardized for direct attachment to conventional or special types of main frame, or to frames of the single central-member or back-bone type, and will enable the effective embodiment in the chassis structure, of independently-sprung suspensions for either the front wheels, or the back wheels, or both the front and back wheels, and may be adapted to provide for the transmission of drive either to the front steering wheels, or to the back wheels of a vehicle.

According to the said invention, I propose to realize this object by providing for embodiment in automobile chassis, constructions that comprise a rigid cross-member which is adapted to be bolted or otherwise secured across the main chassis-frame and embodies end brackets which are adapted to house or carry the journal bearings pertaining to the top and bottom links of two systems of short-link parallelogram wheel-suspensions, together with the static anchorages appertaining to a system of torque springs which are disposed transversely to the cross member so that when the latter is assembled to the main frame, the said springs are disposed in fore-and-aft relation to the brackets. The springs are preferably of the rubber-unit type as described in the specifications of British Letters Patent Nos. 236,243, 363,039, and 419,291, and may be arranged in connection with either the short top links or the longer bottom links of the respective parallelograms, with their static members anchored to the cross-member brackets and their torque members anchored to their inner journalled ends of the said links.

Figure 2:
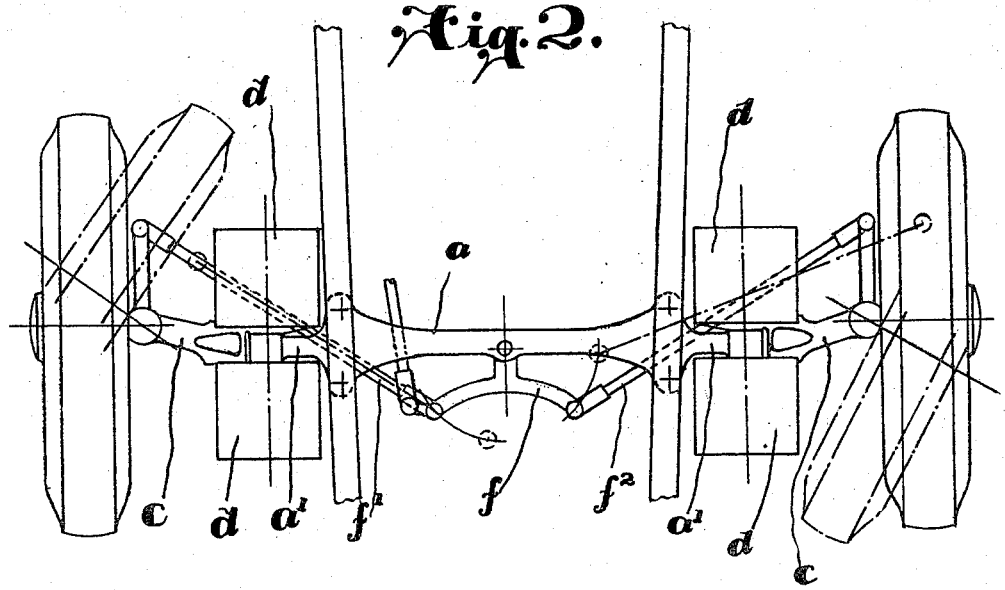

In the accompanying drawings, Figures 1 and 2 are an elevation and a plan view, respectively, of a steering wheel suspension system which is embodied in a self-contained unit according to my invention, and is adapted to be bolted to any ordinary or standardized main chassis-frame, Figure 2a is a plan view, partly in section, showing a front-wheel suspension unit according to my invention, in which each wheel is carried by a single suspension link, Figure 3 is an elevation of a rear-wheel suspension unit according to my invention, Figure 4 is a plan view of the form of my invention shown in Fig. 3, Figure 5 is a partial sectional elevation on the dotted line 5—5 of Figure 3, Figure 6 is a sectional view on the dotted line 6—6 of Figure 3, Figure 7 shows another construction, partly in section, of a rear-wheel suspension unit according to my invention, Figure 8 shows a modified construction of front-wheel suspension unit according to my invention, Figure 9 shows a front-wheel suspension unit that embodies the final reduction gear box of a transmission system, and, Figure 10 shows a suspension system in which torque-bar springs are used.

The steering wheel suspension system shown in Figures 1 and 2 is embodied in a self-contained unit adapted to be bolted to any ordinary or standardized main chassis-frame, and comprises a rigid member $a$ which is adapted to be bolted or otherwise rigidly secured to the side members of a main chassis-frame $b$, and embodies end brackets $a^1$ that house or carry the journal bearings of two systems of short-link parallelogram wheel suspensions (the top link of each system being marked $c$ and the complementary long link being marked $c^1$) together with their torque springs $d$ and the static anchorages of the said springs. The springs, as shown, are of the rubber type as above referred to, and their torque discs are bolted or otherwise secured to the inner journalled ends of the top links $c$. The outer ends of the links $c$ $c^1$ are articulated to a coupling member $e$ that carries the front wheel axle.

The parts of the cross members inwards of the end brackets may be formed with seatings or beds for the longitudinal members of the main chassis frame, and these seatings may be arranged above or below the body of the member, according to whether the unit is adapted for assembly in under-sprung or overhead relation to the said main frame.

When the steering wheels are intended to be driven by Cardan cross-shafts, the cross member of the unit may be arranged to carry or house the gear box of the drive-transmission system, and the end brackets of the said cross member may be suitably apertured or formed with "spectacles" to provide for the passage of the cross-shaft from the said gear-box into connection with the shaft-driven road-wheel axis.

In the unit shown in Figures 1 and 2, the torque spring units are arranged in connection with the journal spindles of the top links, and the elevated disposition of the said top links with respect to the bottom links enables the embodiment in each link system of two spring units, or two sets of spring units, arranged respectively in front of and behind the corresponding bracket of the cross-member and in a fore-and-aft alignment parallel, or substantially parallel, with the side member of the main frame. Where one spring member of each suspension is thus located in front of the axle-bracket, ample space is provided for permitting turning of the vehicle wheels to the right or left during steering operations, as the space forward of the said bracket is not unduly encumbered by the presence of the torque-spring unit.

The overhead disposition of the spring units is preferred in the case of front or steering wheel suspensions, since it enables certain of the steering linkages to be embodied in the unit construction and arranged in underslung relation to the cross member, without any consequential reduction of the ground clearance below the said linkages.

Furthermore, the arrangement of the spring-units in fore-and-aft relation to the journal spindles of either the top or the bottom suspension links enables the fixed or static members of the fore-and-aft springs to be anchored in common to the end brackets of the cross member and also enables provision to be made for the even distribution of the torque load over the fixed spindle on which the said springs are mounted when their respective torsion members are fastened or anchored to the journalled ends of the links. And when dual springs are arranged as above described, and the top links transmit the torque load to the springs, it is preferred to embody, in each wheel suspension, a single top-link $c$ of wide and rigid section (such as that shown in Figure 7) and to provide the inner or journal end thereof with two widely separated bearings so that the link may be carried on shafts $c^5$ which are fixed in, and respectively extend fore-and-aft of, the cross-member end-bracket $a^1$.

Another construction in which a single wide and rigid link is associated with a single torque spring is shown in Figure 2a, where the link $c$ is journalled on the bracket-supported spindle or shaft $c^5$ and is anchored to the torque member $d^1$ of the spring $d$ whilst the static member of the said spring is splined or otherwise anchored to the shaft $c^5$.

In the case of a steering-wheel suspension unit adapted for use in conjunction with a steering gear of the Ackermann type (such as that shown in Figures 1 and 2) the steering linkage may be so arranged with respect to the cross member that it will not interfere with the adoption of a forward-position mounting for an engine arranged in the longitudinal centre-line of the automobile. For example, a bell-crank type lever $f$ may be journalled to the middle of the cross-member $a$ of the unit so that its arms may be respectively connected to the link-suspended wheels by tie-rods $f^1$ $f^2$. The bell-crank type lever $f$ may be arranged either in front of, or underneath, or behind the cross-member $a$, according to the requirements of the wheel and brake arrangements. In order to provide sufficient clearance between the steering linkages and a forwardly-placed engine, a forward arrangement of the bell-crank type lever $f$ is preferred, which will enable the tie-rods $f^1$ $f^2$ to be taken from the respective arms of the bell-crank, underneath the bottom-wheel suspension links, into connection with the steering arms of the road-wheels, all as clearly shown in Figures 1 and 2.

In the rear-wheel suspension unit shown in Figures 3 to 6, the cross member $a$ may be a forging or drop stamping in which the end brackets $a^1$ that house or carry the inner journals of the suspension links are integral with the body portion of the said member, but alternatively, built-up constructions may be adopted where, for example, the body and bracket portions are produced from separate forgings or stampings and assembled into unit form by welding, bolting, or riveting.

The end brackets may be made of a bell-like formation and be arranged to house the inner anchorages of the top and bottom suspension links and their torque springs as in which case the anchor pins or spindles pertaining to either or both links may be fixed across the bell housings, and the clearance apertures or "spectacles" for the Cardan cross shafts (in the case of driven-wheel suspension units) may be formed at the inner ends of the bell-housings where the latter are connected up with the middle portion of the cross-member assembly. The outer ends of the links are articulated to the anchor plates of the wheel-brakes, at points located respectively above and below the connections between the wheel and its driving shaft.

In the said construction, Figures 3 to 6, where the unit provides for a low seating position combined with good ground clearance and provision for ample wheel displacement, only the journal spindles $a^2$ of the short top-links $c$ are carried within the bell-housing $g$ of the built-up cross member, whereas the journal spindles $a^3$ of the longer bottom links are carried fore-and-aft of yoke-pieces or spectacle members $a^4$ which are embodied in the unit between the bell-housings and the middle portion of the cross-member and through which the wheel-driving shaft $h$ pass.

The back of each spectacle member is formed with bushes in which the spindle $a^3$ is fixed by splining or otherwise, and the fore-and-aft torque-spring units $d$ are carried on these spindles, the static members of the said springs being splined or otherwise anchored to the spindles whilst their torque members are anchored to the links which are journalled on the said pins and oscillate thereon in planes outwards and fore-and-aft of the bell-housing. This arrangement enables the top-links to be mounted to oscillate within the bell-housings on bearing spindles which are substantially elevated in relation to the bottom-link journals, and provides for the said top links making an ample range of oscillation in unison with the wheel driving shafts which also oscillate within the said bell-housings.

To provide for adjustment of the spring units in a construction such as shown in Figures 3 to 6, the yoke pieces or spectacle members that carry the journal spindles of the bottom links may be so journal-mounted in the cross-member as to permit of their rotational or angular movement around their journal centres, and adjusting tie-rods $j$ may be connected with the said yoke pieces and operated by screws $j^1$ or the like for displacing the yokes and the static members of the springs with respect to the torsion or link-anchored members and thereby varying the normal torque on the said springs.

In the said Figures 3 to 6, the middle of the cross-member may be constituted by a trough or channel section pressing or forging $a^6$ in which the front side or wall $a^7$ is relatively shallow to give clearance for the propeller shaft $k$ or gear box $k^1$ of the drive-transmission system and to enable provision to be made for a low body-floor, whilst the rear side or wall $a^8$ is of substantial depth to give the required stiffness.

The open top of the trough-sectioned member may, outwards of the propeller shaft region, be fitted with closure plates $a^9$. Or, as in the front-wheel suspension construction shown in Figure 8, the built-up cross-member may be of a girder-like construction and comprise two or more struts $a^{10}$, $a^{11}$, suitably braced by tie-pieces which may be constituted by the brackets $a^1$ to which the inner ends of the links are journalled, and on which the springs $d$ are mounted. The girder structure may be arranged to contain the final reduction gear box of the transmission system, and the tie-brackets are (as shown in Figure 9) spectacled to give clearance for the movement of the Cardan cross-shafts.

Limiting stops or buffers may be embodied in the unit construction to take the impact of the link-suspended parts under conditions of extreme or abnormal wheel movements. Such stops $s$ $s'$ are included in the unit shown in Figure 1, and these buffering stops are arranged in the paths of oscillation of the suspension links $c$, to be contacted by said links upon extreme or abnormal wheel movements.

An advantage that attends the majority of the unit constructions described is that they enable the embodiment in the bracket ends of the cross member, or in the bell-housings or other end attachments of the said cross-member, of the whole of the anchorages and bearings pertaining to the suspension links, together with the torque spring units. Such self-contained arrangements obviate the necessity of distributing the various anchorages and bearings over different parts of the chassis as is usually required, particularly where spring units of the torque-bar type are employed.

Unit constructions such as are herein described may readily be adapted to incorporate, in a minimum of space, torque-bar or torque-rod spring expedients. For example, and as shown in Figure 10, a torque bar spring may be carried by the end-brackets $a^1$ of the cross-member $a$ in such a manner that when the unit is assembled in a chassis, the bar $m$ is disposed lengthwise of the main frame and on the outside of the adjacent side member thereof. Each such torque-bar $m$ may be splined into the cross-member bracket at one end, whilst the complementary suspension link may be splined or otherwise anchored to the said bar in the region of the said bracket.

To enable the use of effective torque springs in a spring assembly of limited overall dimensions, the main torque rod $m$ may be associated or combined with one or more supplementary torque members. Such supplementary member may consist of a sleeve or tubular sheave $m^1$ which is arranged to telescope or socket over the main torque-bar $m$ and is splined or otherwise anchored at one end to the said main bar whilst its other end is splined or anchored to the suspension link $c$, which link is thus connected to the main torque bar $m$ by the supplementary torque member $m^1$ and is free to oscillate around or relative to the said main torque-bar.

Having described my invention, what I claim and desire to secure by Letters Patent is:—

1. In an independent wheel-suspension system of the type referred to, the combination of a chassis frame having a horizontal side frame member; a horizontal cross member extending transversely of and connected to said side frame member; an end bracket on said cross member; a wheel-suspension link; a shaft anchored to said end bracket and extending substantially parallel to said side frame member, said wheel-suspension link being journaled on said shaft for pivotal movement thereon about an axis substantially parallel to said side frame member; a torque-spring device comprising a torque member, a static member, and means for yieldably resisting relative rotary movement between said torque and static members; means for anchoring the wheel-suspension link to the torque member of said torque-spring device; and means for anchoring the static member of said torque-spring device to said shaft.

2. An independent wheel-suspension system of the type referred to in claim 1 wherein the shaft anchored to the end bracket extends substantially parallel to the side frame member and projects from one side only of the said end bracket.

3. An independent wheel-suspension system of the type referred to in claim 1 wherein the shaft anchored to the end bracket extends substantially parallel to the side frame member and projects from both sides of said end bracket, and wherein the ends of said shaft are connected to the static members of two torque-spring devices, and wherein the wheel-suspension link is pivotally mounted on said shaft on opposite sides of said end bracket with the wheel-suspension link connected with the torque members of each of said two torque-spring devices.

4. An independent and self-contained unit for attachment to a motor vehicle chassis frame to constitute a means for independently suspending the wheels of the motor vehicle, comprising a horizontal cross member adapted to be connected to the chassis frame to extend transversely thereof; an end bracket on said cross member; a wheel-suspension link mounted on said end bracket for pivotal movement about an axis substantially transverse to said cross member; a torque-spring device comprising a torque member, a static member, and means for yieldably resisting relative rotary movement between said torque and static members; means for anchoring the wheel-suspension link to the torque member of said torque-spring device; and means for anchoring the static member of said torque-spring device to the said end bracket, said wheel-suspension link and torque-spring device being carried entirely by said cross member and independent of attachment to said chassis frame.

5. An independent and self-contained unit of the type referred to in claim 4 and adapted for use in connection with the steering wheels of a motor vehicle, wherein a bell-crank lever is journalled to the cross member of the unit and is connected by tie-rods to the independently-suspended steering wheels.

6. An independent and self-contained unit of the type referred to in claim 4 adapted for use in connection with a wheel driven by a Cardan shaft which extends transversely of the chassis frame, wherein the said cross member is of channel form and houses the said Cardan shaft.

7. An independent and self-contained unit of the type referred to in claim 4 adapted for use in connection with a wheel driven by a Cardan shaft which extends transversely of the chassis frame, wherein the end bracket consists of a spectacled bell-like housing adapted to house the bearings for the said wheel-suspension link.

8. An independent and self-contained unit of the type referred to in claim 4 adapted for use in connection with a wheel driven by a Cardan shaft which extends transversely of the chassis frame and which shaft is driven by a main drive shaft extending substantially parallel to said chassis frame, wherein the cross member is of channel form and houses the said Cardan shaft, and wherein the front wall of said channel form cross member, near the center thereof, is of less height than the back wall of said member to give clearance for said main drive shaft.

9. An independent and self-contained unit of the type referred to in claim 4, wherein the torque-spring device comprises a torque bar spring extending substantially transverse to the horizontal cross member and having one end anchored to the end bracket and the other end anchored to the wheel-suspension link.

10. An independent and self-contained unit for attachment to a motor vehicle chassis frame to constitute a means for independently suspending the wheels of the motor vehicle, comprising a horizontal cross member adapted to be connected to the chassis frame to extend transversely thereof; upper and lower end brackets on said cross member, each provided with a bearing; an upper wheel-suspension link mounted on the bearing of the upper of said end brackets for pivotal movement about an axis substantially transverse to said cross member; a lower wheel-suspension link mounted on the bearing of the lower of said end brackets for pivotal movement about an axis substantially transverse to said cross member; a torque-spring device comprising a torque member, a static member, and means for yieldably resisting relative rotary movement between said torque and static members; means for anchoring one of said wheel-suspension links to the torque member of said torque-spring device; and means for anchoring the static member of said torque-spring device to the end bracket on which said wheel-suspension link is pivotally mounted; said wheel-suspension links and said torque-spring device being carried entirely by said cross member and independent of attachment to said chassis frame.

11. An independent and self-contained unit of the type referred to in claim 10 adapted for use in connection with a wheel driven by a Cardan shaft which extends transversely of the chassis frame, wherein the upper and lower end brackets are mounted on a spectacled bell-like housing secured to the outer end of the said cross member, the Cardan shaft extending through said housing to the driven wheel, the bearing for the upper wheel-suspension link being positioned within the said bell-like housing, and the bearing for the lower wheel suspension link being positioned outside said bell-like housing.

COLIN MACBETH.